United States Patent
Schwarz et al.

(10) Patent No.: US 12,020,164 B2
(45) Date of Patent: Jun. 25, 2024

(54) NEURAL NETWORKS FOR SCALABLE CONTINUAL LEARNING IN DOMAINS WITH SEQUENTIALLY LEARNED TASKS

(71) Applicant: DEEPMIND TECHNOLOGIES LIMITED, London (GB)

(72) Inventors: Jonathan Schwarz, London (GB); Razvan Pascanu, Letchworth Garden City (GB); Raia Thais Hadsell, London (GB); Wojciech Czarnecki, London (GB); Yee Whye Teh, Oxford (GB); Jelena Luketina, Oxford (GB)

(73) Assignee: DeepMind Technologies Limited, London (GB)

( * ) Notice: Subject to any disclaimer, the term of this patent is extended or adjusted under 35 U.S.C. 154(b) by 875 days.

(21) Appl. No.: 17/048,023

(22) PCT Filed: Apr. 18, 2019

(86) PCT No.: PCT/EP2019/060070
§ 371 (c)(1),
(2) Date: Oct. 15, 2020

(87) PCT Pub. No.: WO2019/202073
PCT Pub. Date: Oct. 24, 2019

(65) Prior Publication Data
US 2021/0117786 A1    Apr. 22, 2021

Related U.S. Application Data

(60) Provisional application No. 62/659,610, filed on Apr. 18, 2018.

(51) Int. Cl.
*G06N 3/08*      (2023.01)
*G06F 18/22*    (2023.01)
(Continued)

(52) U.S. Cl.
CPC .............. *G06N 3/084* (2013.01); *G06F 18/22* (2023.01); *G06N 3/08* (2013.01); *G06N 5/02* (2013.01); *G06N 20/20* (2019.01)

(58) Field of Classification Search
CPC ........ G06F 18/22; G06N 20/20; G06N 3/045; G06N 3/08; G06N 3/084; G06N 5/02
See application file for complete search history.

(56) References Cited

U.S. PATENT DOCUMENTS

2017/0337464 A1    11/2017  Rabinowitz et al.
2018/0121799 A1*   5/2018   Hashimoto ........... G06F 40/253

FOREIGN PATENT DOCUMENTS

CN    106096767    11/2016
CN    106462801    2/2017
(Continued)

OTHER PUBLICATIONS

Schmidhuber et al., "One Big Net for Everything", Feb. 24, 2018, arXiv:1802.08864v1, pp. 1-17. (Year: 2018).*
(Continued)

*Primary Examiner* — Brent Johnston Hoover
(74) *Attorney, Agent, or Firm* — Fish & Richardson P.C.

(57) ABSTRACT

Methods, systems, and apparatus, including computer programs encoded on computer storage media, for scalable continual learning using neural networks. One of the methods includes receiving new training data for a new machine learning task; training an active subnetwork on the new training data to determine trained values of the active network parameters from initial values of the active network parameters while holding current values of the knowledge parameters fixed; and training a knowledge subnetwork on the new training data to determine updated values of the knowledge parameters from the current values of the knowledge parameters by training the knowledge subnetwork to generate knowledge outputs for the new training inputs that (Continued)

match active outputs generated by the trained active subnetwork for the new training inputs.

16 Claims, 5 Drawing Sheets

(51) Int. Cl.
   *G06N 3/084* (2023.01)
   *G06N 5/02* (2023.01)
   *G06N 20/20* (2019.01)

(56) References Cited

FOREIGN PATENT DOCUMENTS

| | | | |
|---|---|---|---|
| CN | 106503669 | 3/2017 | |
| CN | 106683667 | 5/2017 | |
| CN | 107506799 | 12/2017 | |
| CN | 107508866 | 12/2017 | |
| CN | 107657313 | 2/2018 | |
| DE | 202017106132 | 11/2017 | |
| DE | 202017106132 U1 * | 12/2017 | ............. B25J 9/163 |
| WO | WO 2017/201506 | 11/2017 | |
| WO | WO 2018/017546 | 1/2018 | |
| WO | WO-2018071392 A1 * | 4/2018 | ............. B25J 9/163 |

OTHER PUBLICATIONS

Kirkpatrick et al., "Overcoming catastrophic forgetting in neural networks", Mar., 28, 2017, PNAS, vol. 114, No. 13, pp. 3521-3526. (Year: 2017).*
Aljundi et al., "Expert gate: Lifelong learning with a network of experts," Proceedings of the IEEE Conference on Computer Vision and Pattern Recognition, 2016, pp. 3366-3375.
Andrei et al., "Progressive neural networks," CoRR, Jun. 2016, arxiv.org/abs/1606.04671, 14 pages.
Bellemare et al., "Investigating contingency awareness using atari 2600 games," Association for the Advancement of Artificial Intelligence, 2012, 8 pages.
Bengio, "Deep learning of representations for unsupervised and transfer learning," JMLR: Workshop and Conference Proceedings, 2012, 27:17-36.
Berseth et al., "Progressive Reinforcement Learning with Distillation for Multi-Skilled Motion Control," CoRR, Feb. 2018, arxiv.org/abs/1802.04765, 15 pages.
Caruana et al., "Multitask learning," Machine Learning, Jul. 1997, 28:41-75.
Furlanello et al., "Active long term memory networks," CoRR, Jun. 2016, arxiv.org/abs/1606.02355, 10 pages.
Ghosh et al., "Divide-and-conquer reinforcement learning," CoRR, Nov. 2017, arxiv.org/abs/1711.09874, 14 pages.
Graves et al.. "Hybrid computing using a neural network with dynamic external memory," Nature, 538(7626):471-476.
He et al., "Overcoming catastrophic interference by conceptors," CoRR, Jul. 2017, arxiv.org/abs/1707.04853, 17 pages.
Hinton et al., "Distilling the knowledge in a neural network," CoRR, Mar. 2015, arXiv:1503.02531, 9 pages.
Huszar et al., "On quadratic penalties in elastic weight consolidation," CoRR, Dec. 2017, arXiv:1712.03847, 5 pages.
Kirkpatrick et al., "Overcoming catastrophic forgetting in neural networks," PNAS, Mar. 2017, 114(13):3521-3526.
Lake et al., "Human-level concept learning through probabilistic program induction," Science, Dec. 2015, 350(6266):1332-1338.
Li et al., "Learning without forgetting," IEEE Transactions on Pattern Analysis and Machine Intelligence, Dec. 2018, 40(12):2935-2947.
Li et al., "Stochastic expectation propagation," Advances in Neural Information Processing Systems 28, 2015, pp. 2323-2331.
Lopez-Paz et al., "Gradient episodic memory for continual learning," Advances in Neural Information Processing Systems 30, 2017, pp. 6470-6479.
Minka, "Expectation propagation for approximate Bayesian inference," CoRR, Jan. 2013, arxiv.org/abs/1301.2294, 8 pages.
Nguyen et al., "Variational continual learning," CoRR, Oct. 2017, arxiv.org/abs/1710.10628, 18 pages.
Parisotto et al., "Actor-mimic: Deep multitask and transfer reinforcement learning," CoRR, Nov. 2015, arXiv:1511.06342, 16 pages.
PCT International Preliminary Report on Patentability in International Appln. No. PCT/EP2019/060070, dated Oct. 29, 2020, 14 pages.
PCT International Search Report and Written Opinion in International Appln. No. PCT/EP2019/060070, dated Jul. 18, 2019, 20 pages.
Rebuffi et al., "iCaRL: Incremental classifier and representation learning," Proceedings of the IEEE Conference on Computer Vision and Pattern Recognition, 2017, 10 pages.
Ring, "Continual Learning in Reinforcement Environments," Dissertation for degree of Doctor of Philosophy, University of Texas at Austin, Aug. 1994, 138 pages.
Robins, "Catastrophic forgetting, rehearsal and pseudo rehearsal," Connection Science, 1995, 7(2):123-146.
Rozantsev et al., "Beyond sharing weights for deep domain adaptation," IEEE Transactions on Pattern Analysis and Machine Intelligence, Apr. 2019, 41(4):10 pages.
Rusu et al., "Policy Distillation," CoRR, Nov. 2015, arxiv.org/abs/1511.06295, 13 pages.
Schmidhuber et al., "One Big Net For Everything," CoRR, Feb. 2018, arxiv.org/abs/1802.08864, 17 pages.
Schwarz et al., "Progress & Compress: A scalable framework for continual learning," CoRR, May 2018, arxiv.org/abs/1805.06370, 13 pages.
Shin et al., "Continual learning with deep generative replay," 31st Conference on Neural Information Processing Systems, 2017, 10 pages.
Shu et al., "Hierarchical and interpretable skill acquisition in multi-task reinforcement learning," CoRR, Dec. 2017, arxiv.org/abs/1712.07294, 14 pages.
Silver et al., "Lifelong machine learning systems: Beyond learning algorithms," AAAI Spring Symposium Series, 2013, 7 pages.
Taylor et al., "An introduction to inter-task transfer for reinforcement learning," AI Magazine, 2011, 32(1):15-34.
The et al., "Distral: Robust multitask reinforcement learning," Advances in Neural Information Processing Systems 30, 2017, pp. 11 pages.
Office Action in European Appln. 19719243.8, dated Sep. 27, 2023, 11 pages.
Office Action in Chinese Appln. No. 201980026806.9, dated Dec. 29, 2023, 32 pages (with English translation).
Zhou et al., "Time series forecasting system based on evolutionary fuzzy neural network," Microcomputer Development, 6.

* cited by examiner

NEURAL NETWORKS FOR SCALABLE CONTINUAL LEARNING IN DOMAINS WITH SEQUENTIALLY LEARNED TASKS

CROSS-REFERENCE TO RELATED APPLICATION

This application is a National Stage Application under 35 U.S.C. § 371 and claims the benefit of International Application No. PCT/EP2019/060070, filed Apr. 18, 2019, which claims priority to U.S. Application No. 62/659,610, filed Apr. 18, 2018, entitled NEURAL NETWORKS FOR SCALABLE CONTINUAL LEARNING IN DOMAINS WITH SEQUENTIALLY LEARNED TASKS, the disclosure of which is incorporated herein by reference.

BACKGROUND

This specification relates to multi-task neural networks, i.e., to using the same neural network to perform multiple machine learning tasks.

Neural networks are machine learning models that employ one or more layers of nonlinear units to predict an output for a received input. Some neural networks include one or more hidden layers in addition to an output layer. The output of each hidden layer is used as input to or more other layers in the network, i.e., one or more other hidden layers, the output layer, or both. Each layer of the network generates an output from a received input in accordance with current values of a respective set of parameters.

SUMMARY

This specification describes a system implemented as computer programs on one or more computers in one or more locations that trains a neural network to perform multiple machine learning tasks.

Because of the architecture of the neural network and the way that the neural network is trained on the various machine learning tasks, the neural network is capable of continual learning in a scalable manner. Continual learning refers being able to learn a new machine learning task while not forgetting earlier tasks. In other words, continual learning refers to training the neural network to attain acceptable performance on a new machine learning task while maintaining acceptable performance on earlier tasks.

Particular embodiments of the subject matter described in this specification can be implemented so as to realize one or more of the following advantages.

Many systems are required to perform multiple different machine learning tasks. For example, some systems may be required to perform multiple different image classification tasks, e.g., multiple different tasks that require classifying an input image into different classes. As another example, some systems may be required to perform multiple different speech recognition tasks, e.g., multiple different hotword detection tasks for different users of the same mobile device. As yet another example, systems that control mechanical agents may be required to control the same agent to perform multiple different tasks.

Some conventional approaches to multi-task learning require adding new parameters for each task. For example, some approaches use separate neural networks for each task. As another example, some approaches add a new subnetwork to an existing neural network for each task. Because new parameters are added for each task, these systems can quickly become overly computationally complex, preventing them from being effectively used for multiple tasks. That is, because new parameters are added for each task, the systems consume more computational resources, e.g., memory, processing power, and processing time, with each new task that they are required to perform.

Other conventional approaches to multi-task learning use the same neural network for each task and adjust the parameter values of the neural network for each new task which the system is required to perform. These systems can fail when required to perform multiple tasks. In some cases, as the parameter values change to enable high-quality performance on new tasks, performance on earlier tasks degrades because the new values are no longer useful for the earlier tasks. In other cases, e.g., when the parameter values are constrained to not deviate too much from earlier values, the neural network cannot be trained to achieve high quality performance on new tasks.

In contrast, the systems as described in this specification can generate high-quality outputs for multiple different tasks in a resource-efficient manner, i.e., without consuming an excessive amount of computational resources as the number of tasks the system is required to perform increases.

In general terms, the present document describes a neural network that includes a knowledge sub-network and an active sub-network. For example, each sub-network may be a multi-layer system, having an output layer generating an output of the sub-network. During training, both sub-networks typically receive the same input (e.g. when the neural network is performing a given task, the input to both sub-networks is an example of input data which the neural network is to transform into output data according to the task), but some or all of the layers of the active sub-network receive an additional input generated by the knowledge sub-network (e.g. an output of a layer of the output network which is not the output layer of the knowledge sub-network).

The neural network is successively trained to learn multiple tasks. For each task, the active sub-network is first trained (e.g. starting from an initial state) to learn the task, and the knowledge sub-network then trained to generate outputs which match outputs of the active sub-network when respective examples of the task are input to both networks. For each new task (e.g. each task except the first), the training of the knowledge sub-network for the new task uses an objective function including one or more terms which penalize modification of the parameters of the knowledge network compared to the values of the parameters before the training of the knowledge sub-network for the new task.

The described system maintains effective performance on earlier tasks even after being trained on new tasks even though the number of parameters of the neural network does not increase as it is trained on new tasks. This is because the trained active subnetwork is used to "distill" knowledge learned from a new task into the knowledge subnetwork while preventing the knowledge subnetwork from "forgetting" earlier tasks. That is, the knowledge subnetwork is trained to match outputs generated by the trained active subnetwork on a new task while still maintaining effective performance on the earlier task.

While being trained on a new task, because of the connections between the knowledge subnetwork and the active subnetwork and because the knowledge parameters are fixed while the active subnetwork is trained, the described system effectively takes advantage of knowledge extracted from earlier tasks to speed up training on the new task (and decrease the amount of computational resources required for training), increase performance on the new task, or both.

Because of the way in which the knowledge subnetwork is trained, the described systems are trainable on a large number of new tasks without resulting in excessive degradation of performance on earlier tasks and, as stated above, without increasing the amount of computational resources consumed by the neural network.

Additionally, the described systems are capable of positive backwards transfer. That is, because of the way in which the knowledge subnetwork is trained on a given task, after the system trains the neural network on a new task, the performance of the knowledge subnetwork on earlier tasks can improve if the new task is similar or relevant to the earlier task. Thus, the systems can improve performance on an earlier task without seeing new training data for that task, allowing the training to be even more resource-efficient.

This makes the described systems suitable for use in applications with limited computational resources. A particular example of this is a neural network implemented on a consumer device, such as a mobile device (e.g. a smart phone), having limited computational power and memory resources. The described systems may, for example, be trained to solve a plurality of user-defined tasks, such as recognizing specific hot-words (e.g. commands) spoken by the user, e.g. with different hotwords being relevant in different situations in which the user uses the mobile device. Another particular example of this is a neural network embedded in a control system for a robot, where the neural network is used to control the robot to perform multiple different tasks.

Further, because after training the same knowledge subnetwork is used to generate the outputs for all of the tasks, the systems do not require received inputs to be labelled with the task to which they correspond. This allows the described systems to be used even when, at test time, the system does not have access to information that specifies which input corresponds to which task.

In some cases, at least one of the tasks the neural network learns, and preferably more than one of the series of tasks, such as all of the series of tasks, are:

(i) tasks of transforming input sensor data charactering the real world (e.g. an image or video captured by a camera; or a sound signal captured by a microphone) into an output which classifies the sensor data into one of a plurality of categories;

(ii) tasks of transforming input data (e.g. text data) into control data for a unit which acts on the real world (e.g. an actuator, an image generation device (a screen or a projector), or a speaker unit), or (iii) tasks of transforming input data characterizing an environment (e.g. a real-world environment) with which an agent, e.g., a robot or an autonomous vehicle, interacts, into output data which defines actions for the agent (e.g. output data is, or which is used to generate, control data for the agent).

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
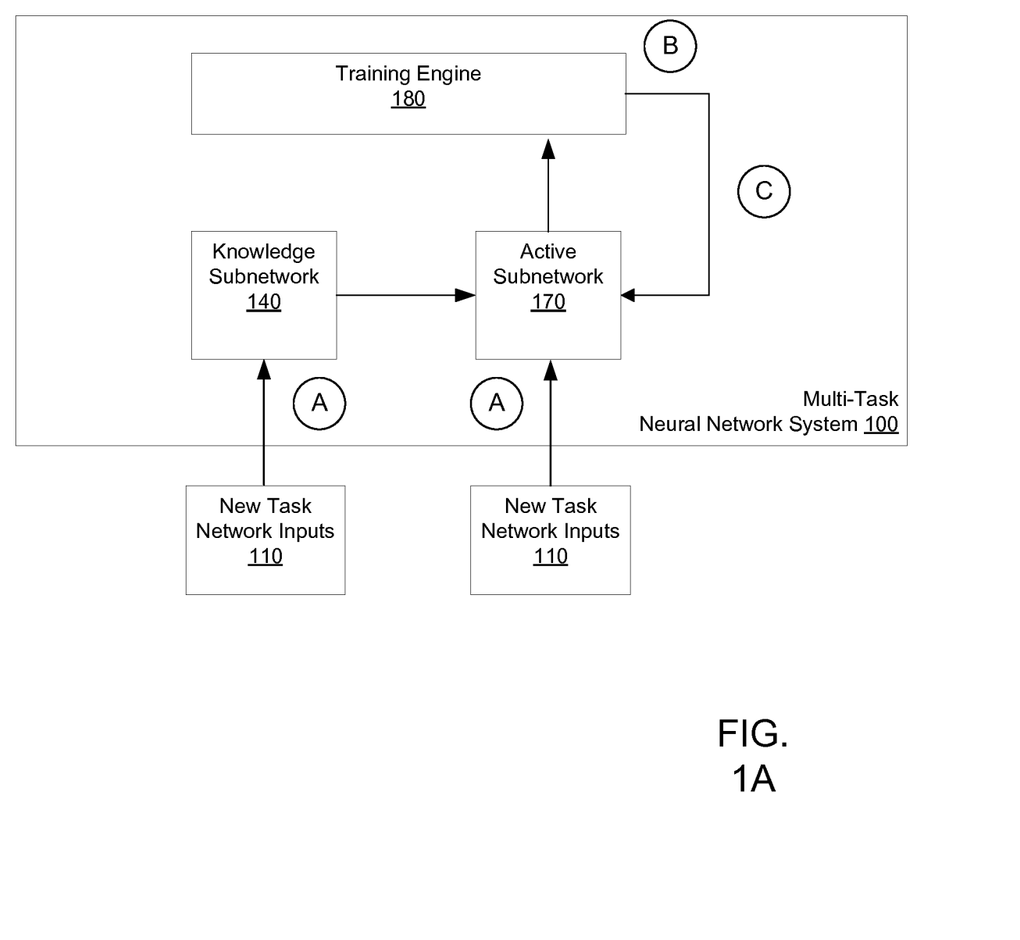
FIGS. 1A and 1B show an example multi-task neural network system.
Figure 1B:
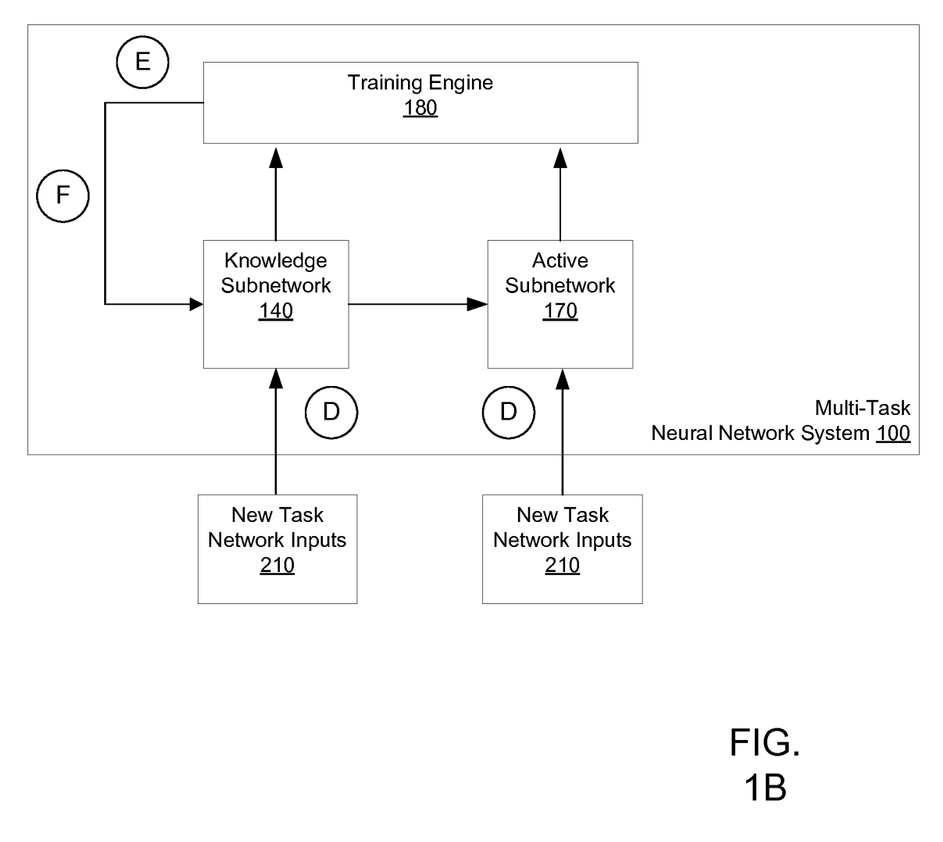

FIGS. 1A and 1B show an example multi-task neural network system 100. The multi-task neural network system 100 is an example of a system implemented as computer programs on one or more computers in one or more locations, in which the systems, components, and techniques described below can be implemented.

The multi-task neural network system 100 trains a neural network to perform multiple machine learning tasks. Because of the architecture of the neural network and the way that the neural network is trained on the various machine learning tasks, the neural network is capable of continual learning in a scalable manner. Continual learning refers to being able to learn a new machine learning task while not forgetting earlier tasks. In other words, continual learning refers to training the neural network to attain acceptable performance on a new machine learning task while maintaining acceptable performance on earlier tasks. "Acceptable" may be defined as having an error rate on the task which is below a threshold. The definition of the error rate, and the corresponding threshold, may be different for different tasks. Optionally, following learning of a new task, there may be a step of checking that the error rate for one or more of the earlier tasks is below the corresponding threshold, and if it is determined that for one or more of the earlier tasks this is not the case, those earlier task(s) may be successively learned again (e.g. until the error rate on those tasks is again acceptable).

Generally, the system 100 trains the neural network on multiple tasks from a domain of sequentially learned tasks, i.e., a domain in which tasks are learned in sequence. That is, the system 100 trains the neural network on multiple machine learning tasks in sequence, i.e., one after the other, rather than training the neural network on multiple tasks in parallel. In some cases, the system "revisits" certain tasks during the training, i.e., the same task may appear at multiple positions in the sequence.

While the system 100 trains the neural network on tasks sequentially, once the neural network has been trained on a given task, the system 100 can receive and process inputs for any task for which the neural network has already been trained.

In some cases, the multiple machine learning tasks are supervised learning tasks.

For example, the multiple tasks can include multiple different image classification tasks. Each image classification task requires an output that is a score distribution over a set of object categories. In some cases, the images to be classified can be drawn from different distributions for different image classification tasks, e.g., one task can require classifying images of real-world objects while another task can require classifying paintings or other artificially generated images. Alternatively or in addition, the sets of object categories are different for different image classification tasks. For example, one task may require classifying images that depict objects from one subset of a larger set of categories while another task may require classifying images that depict objects from a different subset of the larger set of categories.

As another example, the multiple tasks can include multiple different speech recognition tasks. For example, the tasks can include multiple hotword detection tasks, where each task requires the recognition of a different hotword or sequence of hotwords.

As another example, the multiple tasks can include multiple different natural language processing tasks. For example, the tasks can include multiple machine translation tasks, with each task requiring translation into a different language.

In some other cases, the multiple machine learning tasks are multiple different reinforcement learning tasks.

For example, the tasks can include multiple different agent control tasks, i.e., tasks that include controlling a mechanical agent to cause the agent to perform a particular task. The agent can be, e.g., a robot or an autonomous or semi-autonomous vehicle. Each input to the neural network can include an observation characterizing the state of an environment being interacted with by the agent and one of the outputs of the neural network can be a policy output that defines an action to be performed by the agent in response to the observation, e.g., an output that defines a probability distribution over possible control inputs for the agent, an output that predicts returns for one or more of the possible control inputs, or an output that directly identifies the optimal control input for the agent in response to the observation. The neural network may also generate a value output that estimates the value to completing the current task of the environment being in the current state. The multiple different tasks can include tasks that require controlling the same agent to complete two different tasks, tasks that require controlling different agents to complete the same task, or both. The environment may be the same or may differ across different tasks.

The neural network that is being trained to perform the multiple tasks includes a knowledge subnetwork 140 and an active subnetwork 170. Both the knowledge subnetwork 140 and the active subnetwork 170 are configured to generate the same kind of output, i.e., the type of output that is required for the multiple tasks for which the neural network is being trained. For example, both subnetworks can generate a probability distribution over a set of possible classifications for each received input for supervised learning tasks or can generate a policy output, value output, or both for reinforcement learning tasks. The output generated by the knowledge subnetwork 140 will be referred to in this specification as a knowledge output and the output generated by the active subnetwork 170 will be referred to in this specification as an active output.

Once the neural network has been trained on a particular task, the knowledge output, i.e., the output of the knowledge subnetwork 140, can be used as the output of the neural network for inputs corresponding to that task (and to any earlier tasks in the training sequence on which the neural network has already been trained).

While the active subnetwork 170 and the knowledge subnetwork 140 generate the same kind of outputs, the two subnetworks generally have different neural network architectures.

More specifically, both the active subnetwork 170 and the knowledge subnetwork 140 include a respective plurality of neural network layers (referred to as "active layers" and "knowledge layers," respectively) and have respective parameters (referred to as "active parameters" and "knowledge parameters," respectively).

However, at least one of the active layers in the active subnetwork 170 is configured to, during the processing of an input by the two subnetworks, receive as input a layer output generated by one of the knowledge layers in the knowledge subnetwork 140. As will be seen from the description below, configuring the neural network in this manner allows the active subnetwork 170 to make use of information learned by the knowledge subnetwork 140 for earlier tasks while being trained on a given task.

The active subnetwork 170 and knowledge subnetwork 140 can have any of a variety of neural network architectures in which some or all of the active neural networks layers have respective corresponding layers in the knowledge subnetwork and receive as input an input derived from the output of the corresponding knowledge layer.

In one form, each of the subnetworks comprises a sequence of layers, in which a first layer of the sequence receives inputs to the subnetwork, the last layer of the sequence is an output layer which generates outputs of the subnetwork, and each layer (except the last layer) generates outputs which are fed as inputs to the next layer of the sequence. Either or both of the networks may be feed-forward systems in which output data from one layer is not fed back to an earlier layer of the sequence. Depending on the inputs to the neural networks, the layers in the sequence can include one or more of: fully-connected layers, convolutional layers, or recurrent layers.

As a particular example, the knowledge subnetwork and a portion of the active sub-network may have the same architecture (e.g. may each contain the same number of layers), but the active subnetwork can also include multiple layer-wise adaptor layers. Each layer-wise adaptor layer corresponds to a respective knowledge layer and a respective active layer and is configured to receive as input a layer output generated by the corresponding one of the knowledge layers, process the layer output to generate a transformed output, and provide the transformed output as input to the corresponding one of the active neural network layers. Thus, the corresponding active neural network layer receives an input both from the layer-wise adaptor layer and from another active layer in the active subnetwork 170.

In the case where the active subnetwork 170 and the knowledge subnetwork 140 each include a sequence of layers, one after the other, a given layer-wise adaptor layer can connect the output of a knowledge layer at position i in the sequence to the input of an active layer at position i+1 in the sequence. When the knowledge layer is a fully-connected or recurrent layer, the layer-wise adaptor layer can be a multi-layer perceptron. When the knowledge layer is a convolutional layer, the layer-wise adaptor layer can be a 1×1 convolutional layer.

Examples of layer-wise adaptor layers and architectures for the active and knowledge subnetworks that can be employed for various tasks are described in more detail in Progressive Neural Networks, Andrei A. Rusu, Neil C. Rabinowitz, Guillaume Desjardins, Hubert Soyer, James Kirkpatrick, Koray Kavukcuoglu, Razvan Pascanu, Raia Hadsell, available at https://arxiv.org/abs/1606.04671, the entire contents of which are hereby incorporated by reference herein.

To train the neural network on a given new task, the system first trains the active subnetwork 170 on training data for the task while holding the values of the active parameters 140 of the knowledge subnetwork fixed. This training of the active subnetwork 170 will be referred to as the "progress" phase of the training and is depicted in FIG. 1A.

If the given new task is not the first task that the neural network is being trained on, the system re-initializes the values of the active parameters of the active subnetwork 170 and then trains the active subnetwork 170 to determine trained values of the active parameters from the re-initialized values. Re-initializing the active parameters is described in more detail below with reference to FIG. 3.

The system 100 then trains the knowledge subnetwork 140 while holding the trained values of the active parameters of the active subnetwork 170 fixed. In particular, the system trains the knowledge subnetwork 140 to generate knowledge outputs that match active outputs generated by the trained active subnetwork for training inputs for the new task. When the neural network has already been trained on one or more earlier tasks, the system 100 trains the knowledge subnetwork to attain acceptable performance at matching the active outputs while maintaining acceptable performance on the earlier machine learning tasks. Thus, once trained, the knowledge subnetwork 140 can generate high-quality outputs for both the new task and the earlier tasks. This training of the knowledge subnetwork 140 will be referred to as the "compress" phase of training and is depicted in FIG. 1B.

In particular, as depicted in FIG. 1A, the system 100 performs the progress phase of training by repeatedly performing stages A through C on different sets of training inputs 110 for the new task.

For example, for supervised learning tasks, the different sets of training inputs can be different micro-batches of training inputs (along with corresponding target outputs) for the new task. As another example, for reinforcement learning tasks, the different sets of training inputs can be different sets of experience data, i.e., different trajectories or micro-batches of experience tuples, generated as a result of the agent interacting with the environment to perform the new task.

At stage A of the progress phase of training, the system 100 processes each received new task network input 110 using the knowledge subnetwork 140 and the active subnetwork 170.

Because some or all of the active layers receive as input outputs generated by or derived from outputs generated by the knowledge layers as described above, when the neural network has already been trained on one or more earlier tasks, this allows the outputs generated by the active subnetwork 170 to leverage information learned by the knowledge subnetwork 140 during training on the earlier tasks that may also be relevant to the current task. That is, the system 100 effectively leverages similarities between the earlier task and the new task to improve the training of the active subnetwork 170 on the new task.

At stage B of the progress phase of training, a training engine 180 determines gradients with respect to the active parameters using a machine learning technique that is appropriate for the machine learning task. For example, for supervised learning tasks, the system may determine a gradient of a supervised learning objective function, e.g., a cross-entropy loss or a log-likelihood loss, that measures the quality of the active outputs relative to the ground truth or target outputs for the new inputs 110. As another example, for reinforcement learning tasks, the system may determine the gradient using a reinforcement learning technique that is appropriate for the types of outputs generated by the subnetworks, e.g., a policy gradient technique, an actor-critic technique, or a Q-learning technique.

At stage C of the progress phase of training, the system 100 updates the current values of the active parameters in accordance with the update rule that is employed by the machine learning technique while holding the knowledge parameters fixed.

Thus, during the progress phase of training, both the knowledge subnetwork 140 and the active subnetwork 170 process each received training input, but only the values of the active parameters are updated while the values of the knowledge parameters are fixed.

As depicted in FIG. 1B, the system 100 performs the compress phase of training by repeatedly performing stages D through F on different sets of training inputs 210 for the new task.

In some cases, the training inputs 210 used in the compress phase are the same as the training inputs 110 that were used in the progress phase.

In some other cases, the training inputs used in the compress phase are different from the training inputs that were used in the progress phase. For example the training inputs used in the compress phase may be a super set of the training inputs used in the progress phase, e.g., in supervised learning tasks where additional, unlabeled inputs are available.

At stage D of the compress phase of training, the system 100 processes each received new task network input 210 using the knowledge subnetwork 140 to generate a knowledge output for each task network input 210 and processes each received new task network input 210 using the active subnetwork 170 to generate an active output for each task network input 210.

In particular, the system 100 processes the network inputs using the active subnetwork 170 in accordance with the trained values of the active parameters that were determined during the progress phase of training, i.e., the values of the active parameters are fixed after the progress phase and are not adjusted during the compress phase, while processing the network inputs using the knowledge subnetwork 140 in accordance with the values of the knowledge parameters after the preceding iteration of the stages D-F.

At stage E of the compress phase of training, the training engine 180 determines a gradient with respect to the knowledge parameters of an objective function that encourages knowledge outputs for the new training inputs to match active outputs generated by the trained active subnetwork for the new training inputs.

More specifically, when the knowledge subnetwork 140 has already been trained on one or more earlier tasks, the objective function encourages the knowledge subnetwork to attain acceptable performance at matching the active outputs while maintaining acceptable performance on the earlier machine learning tasks.

Examples of objective functions that can be used for the compress phase of training are described in more detail below with reference to FIG. 4.

At stage F of the compress phase of training, the training engine 180 updates the current values of the knowledge parameters using the determined gradients, i.e., by determining an update to the current values of the knowledge parameters from the gradients using an update rule, e.g., using the rmsProp or Adam optimizer update rules, and then adding the update to the current values of the parameters.

By repeatedly performing stages D-F in this manner, the system 100 trains the knowledge subnetwork 140 to achieve acceptable performance on the new task while maintaining acceptable performance on any earlier tasks on which the knowledge subnetwork has already been trained.

After training the knowledge subnetwork 140 and the active subnetwork 170 on the new task, the system 100 can use the knowledge outputs generated by the knowledge subnetwork 140 for new inputs as the outputs of the neural network for the new task.

Thus, the system 100 trains the knowledge subnetwork 140 to perform well on multiple tasks in a scalable manner, i.e., without increasing the number of parameters of the knowledge subnetwork 140 after training on any given task. In particular, by increasing the "knowledge" of the neural network during the progress phase and then "distilling" or "compressing" that knowledge back into the knowledge subnetwork 140 during the compress phase, the system 100 effectively causes the knowledge subnetwork 140 to perform well on the new task and any earlier tasks without increasing the knowledge subnetwork's size.

Figure 2:
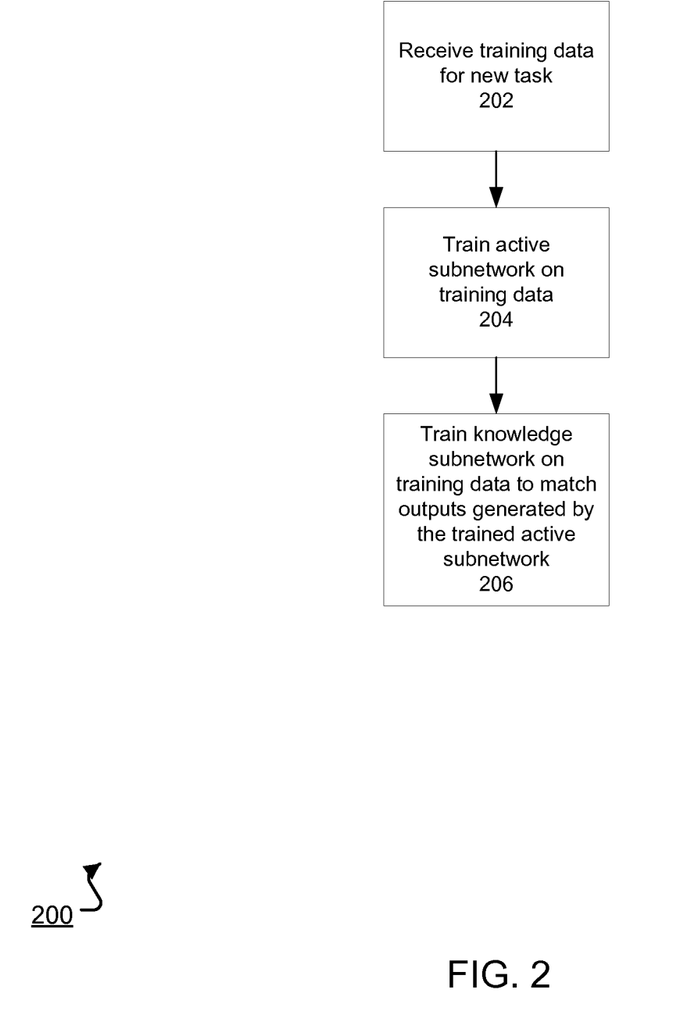
FIG. 2 is a flow diagram of an example process for training the neural network on a new task.

FIG. 2 is a flow diagram of an example process 200 for training the neural network on a new task. For convenience, the process 200 will be described as being performed by a system of one or more computers located in one or more locations. For example, a multi-task neural network system, e.g., the multi-task neural network system 100 of FIG. 1, appropriately programmed, can perform the process 200.

The system receives new training data for the new machine learning task (step 202). The new training data includes new training inputs. When the new task is a supervised learning task, the new training data also includes target outputs for the new training inputs. When the new task is a reinforcement learning task and the training inputs are or each include observations, the new training data also includes data specifying, for some or all of the observations, the action that was performed by the agent in response to the observation and the reward value received by the agent after performing the action.

The system trains the active subnetwork on the new training data to determine trained values of the active network parameters from initial values of the active network parameters while holding the current values of the knowledge parameters fixed (step 204). As described above, if the neural network has already been trained on any earlier tasks, the current values of the knowledge parameters are the values of the knowledge parameters after the training on the earlier tasks. Additionally, as described above, because of the connections between the knowledge layers and the active layers, the active subnetwork leverages information learned by the knowledge subnetwork during the earlier training even though the values of the active parameters were re-set after the earlier training.

The system trains the knowledge subnetwork on the new training data to determine updated values of the knowledge parameters from the current values of the knowledge parameters by training the knowledge subnetwork to generate knowledge outputs for the new training inputs that match active outputs generated by the trained active subnetwork for the new training inputs (step 206).

As described above, because the system uses active outputs as the targets for the training of the knowledge subnetwork, the system may also use, if available, additional training data for the new task when training the knowledge subnetwork, even if the additional training data is unlabeled.

Additionally, as described above, when the knowledge subnetwork has already been trained on one or more earlier machine learning tasks to determine the current values of the knowledge parameters, the system trains the knowledge subnetwork to attain acceptable performance at matching the active outputs while maintaining acceptable performance on the earlier machine learning tasks. Updating the knowledge parameters during this training will be described in more detail below with reference to FIG. 4.

Figure 3:
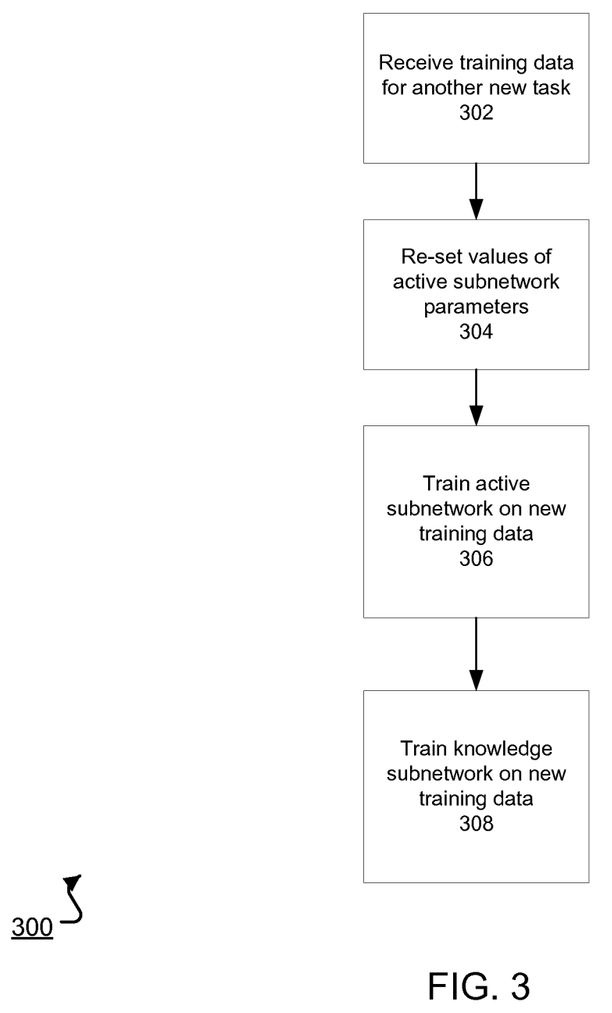
FIG. 3 is a flow diagram of an example process for training the neural network on an additional task after the neural network has already been trained on one or more tasks.

FIG. 3 is a flow diagram of an example process 300 for training the neural network on an additional task after the neural network has already been trained on one or more earlier tasks. For convenience, the process 300 will be described as being performed by a system of one or more computers located in one or more locations. For example, a multi-task neural network system, e.g., the multi-task neural network system 100 of FIG. 1, appropriately programmed, can perform the process 300.

The system receives training data for the additional task (step 302).

The system re-sets the values of the active parameters (step 304). For example, the system can re-set the values to predetermined initial values, e.g., zero or a fixed small positive number. As another example, the system can re-set the values by generating initial values for the active parameters in accordance with a conventional machine learning parameter initialization technique, e.g., by sampling a value for each of the active parameters from a pre-determined distribution. Importantly, the system does not re-set the values of the knowledge parameters and maintains the values of those parameters from the earlier training.

The system then trains the neural network on the additional task as described above.

In particular, the system first trains the active subnetwork on the additional training data to determine trained values of the active parameters from the re-set values (step 306) while holding the already trained values of the knowledge parameters fixed. During this training, even though the values of the parameters were re-set, the active subnetwork is able to use information learned during the earlier training that may be relevant to the additional task because of the connectivity between active layers and knowledge layers.

The system then trains the knowledge subnetwork on the additional training data to determine further trained values of the knowledge parameters while holding the trained values of the active parameters fixed (step 308).

Figure 4:
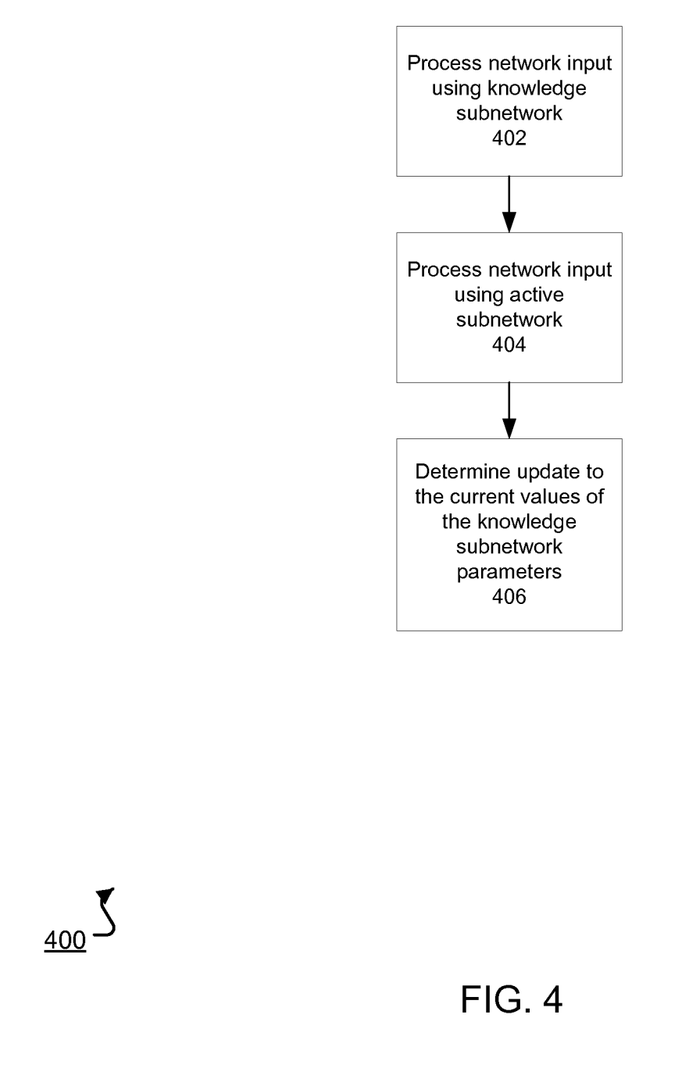
FIG. 4 is a flow diagram of an example process for determining an update to the knowledge parameters during the compress phase of training.

FIG. 4 is a flow diagram of an example process 400 for determining an update to the knowledge parameters during the compress phase of training. For convenience, the process 400 will be described as being performed by a system of one or more computers located in one or more locations. For example, a multi-task neural network system, e.g., the multi-task neural network system 100 of FIG. 1, appropriately programmed, can perform the process 400.

The system can repeat the process 400 for each new network input in a set of network inputs to determine a respective update for each of the network inputs and then combine, e.g., average, the updates for each of the network inputs to determine a final update to the knowledge parameters for the set of network inputs.

The system processes a new network input using the active subnetwork in accordance with the trained values of the active parameters from the progress phase to generate an active output for the new network input (step 402).

The system processes a new network input using the knowledge subnetwork in accordance with the current values of the knowledge parameters to generate a knowledge output for the new network input (step 404).

In some implementations, the outputs of the subnetworks are or include probability distributions and the output layers of the subnetworks include a softmax layer. A softmax layer is a layer that performs a softmax function defined by a temperature. For example, denoting the inputs to the softmax layer by $z_k$ (where the integer k labels the inputs), the outputs of the softmax layer may be $\sigma_k$ where $\sigma_k = e^{-\beta z_k}/\Sigma_k e^{-\beta z_k}$, where the temperature is the reciprocal of $\beta$. During the training of the knowledge subnetwork, the active outputs and knowledge outputs may be generated with an increased temperature relative to the outputs that are generated by the knowledge subnetwork after training. That is, the system sets the temperature of the softmax output layer to a value that is higher than the value that will be used after training, e.g., to a value greater than 1, to cause the probability distributions generated by the softmax output layer to be more evenly distributed than those generated by the trained neural network.

The system determines an update to the current values of the knowledge parameters (step 406).

In particular, the system determines a gradient with respect to the knowledge parameters of an objective function that encourages knowledge outputs for the new training inputs to match active outputs generated by the trained active subnetwork for the new training inputs. If the knowledge subnetwork has already been trained on one or more earlier tasks, the objective function also encourages the knowledge subnetwork to attain acceptable performance at matching the active outputs while maintaining acceptable performance on the earlier machine learning tasks.

More specifically, the system can minimize a loss function that includes: (i) a first term that measures a similarity between knowledge outputs and active outputs for a given new training input and (ii) one or more second terms that penalize the knowledge subnetwork for having values of the knowledge parameters that deviate from the values of the knowledge parameters after the previous round of training.

For example, the first term can be based on a KL divergence between the active outputs and the knowledge outputs, i.e., can be the KL divergence or can be the KL divergence adjusted by a weight.

In some cases, the second terms are the penalty terms from an elastic weight consolidation (EWC) loss function. The penalty terms from the EWC loss slow down learning, i.e., encourage updates to be smaller in magnitude, for certain parameters depending on how important those parameters were to earlier tasks. In particular, the penalty terms from the EWC loss are a sum of penalties from each of the earlier tasks. For a given new task i, the penalty terms, i.e., the second terms in the loss function, satisfy:

$$\frac{1}{2}\sum_{j=0}^{i-1} \|\theta - \theta_j^*\|_{F_j}^2,$$

where $\theta$ are the values of the knowledge parameters as of the time when the loss is evaluated, $\theta_j^*$ is the maximum a posteriori (MAP) parameter when learning task j, $F_j$ is the Fisher information matrix of the knowledge subnetwork for task j evaluated at the MAP parameter for task j, and the norm is the Mahalonobis norm.

The MAP parameter is the mode of the posterior distribution of the knowledge parameters when learning a given task i, i.e., $p(\theta|T_{1:i})$, where $\theta$ are the knowledge parameters and T denotes a task. The MAP parameter can be computed using a standard stochastic optimizer applied to the following loss:

$$-\log p(T_i|\theta) + \frac{1}{2}\sum_{j=0}^{i-1} \|\theta - \theta_j^*\|_{F_j}^2$$

Alternatively, the second term can be a modified, online EWC penalty term that maintains a single overall Fisher information matrix for all of the earlier tasks rather than requiring a separate Fisher to be maintained for each earlier task. In particular, the second term can satisfy:

$$\frac{1}{2}\|\theta - \theta_{i-1}^*\|_{\gamma F_{i-1}}^2,$$

where $\theta$ are the values of the knowledge network parameters as of the time when the loss is evaluated, $\theta_{i-1}^*$ is the MAP parameter after training the knowledge subnetwork on the earlier tasks, i.e., is the MAP parameter for task i−1, $F_{i-1}^*$ is an overall Fisher matrix after training the knowledge subnetwork on all the earlier tasks evaluated at the MAP parameter, $\gamma$ is a hyperparameter that is less than one, and the norm is the Mahalonobis norm.

In these cases, once the system has trained the neural network on task i, the system updates the MAP parameter, i.e., determines a new MAP parameter after the training of the knowledge subnetwork on task i using the stochastic optimizer described above, and updates the overall Fisher matrix. For example, the overall Fisher matrix $F_i^*$ after training the knowledge subnetwork on task i can satisfy:

$$F_i^* = \Gamma F_{i-1}^* + F_i,$$

where $F_i$ is the Fisher matrix for task i evaluated at the MAP parameter after training on task i. In some cases, the system normalizes the Fisher matrix $F_i$ before using it to compute the overall Fisher matrix. This may, for example, cause the loss function to treat each task equally when updating the Fisher rather than giving more weight to tasks that have Fisher matrices with larger norms.

Once the neural network has been trained on a given task, the system can provide data specifying the trained knowledge subnetwork, e.g., the trained values of the knowledge parameters and data defining the architecture of the knowledge subnetwork, to another system for use in performing the new task and any earlier tasks on which the knowledge subnetwork has already been trained. Alternatively or in addition, the system can begin using the trained knowledge subnetwork to perform the new task on newly received inputs.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method of training a multi-task neural network on a new machine learning task,
    wherein the multi-task neural network comprises (i) a knowledge subnetwork and (ii) an active subnetwork,
    wherein the knowledge subnetwork comprises a plurality of knowledge neural network layers and has a plurality of knowledge parameters,
    wherein the knowledge subnetwork is configured to receive a network input and to process the network input to generate a knowledge output for the network input,
    wherein the active subnetwork comprises a plurality of active neural network layers and has a plurality of active network parameters,
    wherein the active subnetwork is configured to receive the network input and to process the network input to generate an active output for the network input,
    and wherein at least one of the active neural network layers is configured to, while generating the active output and the knowledge output from the network input, receive as input an output generated by one of the knowledge neural network layers, the method comprising:
    receiving new training data for the new machine learning task, the new training data comprising a plurality of new training inputs;
    training the active subnetwork on the new training data to determine trained values of the active network parameters from initial values of the active network parameters while holding current values of the knowledge parameters fixed; and
    training the knowledge subnetwork on the new training data to determine updated values of the knowledge parameters from the current values of the knowledge parameters by training the knowledge subnetwork on the new training inputs to minimize a loss function that includes (i) a first term that measures a similarity between knowledge outputs and active outputs for a given new training input, and (ii) one or more second terms that penalize the knowledge subnetwork for having values of the knowledge parameters that deviate from the current values of the knowledge parameters.

2. The method of claim 1, wherein the knowledge subnetwork has already been trained on one or more earlier machine learning tasks to determine the current values of the knowledge parameters.

3. The method of claim 1, wherein the first term is based on a KL divergence between the active outputs and the knowledge outputs.

4. The method of claim 1, wherein the one or more second terms comprise a term that satisfies:

$$\frac{1}{2}\|\theta - \theta_{i-1}^*\|_{\gamma F_{i-1}}^2,$$

where $\theta$ are the values of the knowledge parameters as of the time when the loss function is evaluated, $\theta_{i-1}^*$ is a maximum a posteriori (MAP) parameter after training the knowledge subnetwork on the earlier tasks, $F_{i-1}^*$ is an overall Fisher matrix after training the knowledge subnetwork on the earlier tasks, $\gamma$ is a hyperparameter, and the norm is a Mahalonobis norm.

5. The method of claim 4, further comprising:
    updating the MAP parameter after training the knowledge subnetwork on the new task; and
    updating the overall Fisher matrix after training the knowledge subnetwork on the new task.

6. The method of claim 1, further comprising:
    receiving second new training data for a second new machine learning task;
    re-setting the values of the active network parameters to the initial values; and training the active subnetwork on the second new training data to adjust the values of the active network parameters starting from the initial values while holding the trained values of the knowledge parameters fixed.

7. The method of claim 1, wherein the active neural network layers include one or more layer-wise adaptor layers, and wherein each layer-wise adaptor layer is configured to:
receive as input a layer output generated by a corresponding one of the knowledge layers;
process the layer output to generate a transformed output; and
provide the transformed output as input to a corresponding one of the active neural network layers.

8. The method of claim 1, wherein:
the knowledge subnetwork and active subnetwork each comprise a softmax layer which performs a softmax function defined by a temperature;
following the training of the knowledge subnetwork the neural network is used to perform a task; and
during the training of the knowledge subnetwork, active outputs and knowledge outputs are generated with an increased temperature compared to the temperature used following the training of the knowledge subnetwork.

9. The method of claim 2, further comprising:
after training the knowledge subnetwork on the new training data, receiving an input for one of the earlier machine learning tasks,
processing the input using the knowledge subnetwork to generate a knowledge output for the input, and
providing the knowledge output as a network output for the input.

10. The method of claim 1, wherein the new machine learning task comprises one of:
a task of transforming input sensor data charactering the real world into an output which classifies the input sensor data into one of a plurality of categories;
a task of transforming input data into control data for an actuator which acts on the real world; or
a task of transforming input data characterizing an environment with which an agent interacts, into output data which defines actions for the agent to perform on the environment.

11. A system comprising one or more computers and one or more storage devices storing instructions that when executed by the one or more computers cause the one or more computers to implement a multi-task neural network:
wherein the multi-task neural network comprises a knowledge subnetwork,
wherein the knowledge subnetwork comprises a plurality of knowledge neural network layers and has a plurality of knowledge parameters,
wherein the knowledge subnetwork is configured to receive a network input and to process the network input to generate a knowledge output for the network input, and
wherein the knowledge subnetwork has been trained jointly with an active subnetwork having a plurality of active neural network layers and a plurality active network parameters to perform a plurality of machine learning tasks, the training comprising:
receiving new training data for a new machine learning task, the new training data comprising a plurality of new training inputs;
training the active subnetwork on the new training data to determine trained values of the active network parameters from initial values of the active network parameters while holding current values of the knowledge parameters fixed,
wherein the active subnetwork is configured to receive the network input and to process the network input to generate an active output for the network input, and
wherein at least one of the active neural network layers is configured to, while generating the active output and the knowledge output from the network input, receive as input an output generated by one of the knowledge neural network layers; and
training the knowledge subnetwork on the new training data to determine updated values of the knowledge parameters from the current values of the knowledge parameters by training the knowledge subnetwork on the new training inputs to minimize a loss function that includes (i) a first term that measures a similarity between knowledge outputs and active outputs for a given new training input, and (ii) one or more second terms that penalize the knowledge subnetwork for having values of the knowledge parameters that deviate from the current values of the knowledge parameters.

12. A system comprising one or more computers and one or more storage devices storing instructions that are operable, when executed by the one or more computers, to cause the one or more computers to perform operations for training a multi-task neural network on a new machine learning task,
wherein the multi-task neural network comprises (i) a knowledge subnetwork and (ii) an active subnetwork,
wherein the knowledge subnetwork comprises a plurality of knowledge neural network layers and has a plurality of knowledge parameters,
wherein the knowledge subnetwork is configured to receive a network input and to process the network input to generate a knowledge output for the network input,
wherein the active subnetwork comprises a plurality of active neural network layers and has a plurality of active network parameters,
wherein the active subnetwork is configured to receive the network input and to process the network input to generate an active output for the network input,
and wherein at least one of the active neural network layers is configured to, while generating the active output and the knowledge output from the network input, receive as input an output generated by one of the knowledge neural network layers, the operations comprising:
receiving new training data for the new machine learning task, the new training data comprising a plurality of new training inputs;
training the active subnetwork on the new training data to determine trained values of the active network parameters from initial values of the active network parameters while holding current values of the knowledge parameters fixed; and
training the knowledge subnetwork on the new training data to determine updated values of the knowledge parameters from the current values of the knowledge parameters by training the knowledge subnetwork on the new training inputs to minimize a loss function that includes (i) a first term that measures a similarity between knowledge outputs and active outputs for a given new training input, and (ii) one or more second terms that penalize the knowledge subnetwork for having values of the knowledge parameters that deviate from the current values of the knowledge parameters.

13. The system of claim 12, wherein the knowledge subnetwork has already been trained on one or more earlier machine learning tasks to determine the current values of the knowledge parameters.

14. The system of claim 12, wherein the first term is based on a KL divergence between the active outputs and the knowledge outputs.

15. The system of claim 12, wherein the one or more second terms comprise a term that satisfies:

$$\frac{1}{2}\|\theta - \theta_{i-1}^*\|_{\gamma F_{i-1}}^2,$$

where $\theta$ are the values of the knowledge parameters as of the time when the loss function is evaluated, $\theta_{i-1}^*$ is a MAP parameter after training the knowledge subnetwork on the earlier tasks, $F_{i-1}^*$ is an overall Fisher matrix after training the knowledge subnetwork on the earlier tasks, $\gamma$ is a hyperparameter, and the norm is a Mahalonobis norm.

16. The system of claim 15, the operations further comprising:
    updating the MAP parameter after training the knowledge subnetwork on the new task; and
    updating the overall Fisher matrix after training the knowledge subnetwork on the new task.

* * * * *